United States Patent [19]

Cloessner, Jr.

[11] 4,141,628
[45] Feb. 27, 1979

[54] EYEGLASSES TEMPLE CONSTRUCTION

[76] Inventor: Jacob E. Cloessner, Jr., 17012 General Pickett, Baton Rouge, La. 70816

[21] Appl. No.: 786,480

[22] Filed: Apr. 11, 1977

[51] Int. Cl.² .......................... G02C 5/14; G02C 1/00
[52] U.S. Cl. ................................ 351/111; 351/158; 351/123
[58] Field of Search ............... 351/111, 117, 123, 114, 351/158, 123

[56] References Cited

U.S. PATENT DOCUMENTS 3,768,892  10/1973  Bidgood ............................. 351/158

FOREIGN PATENT DOCUMENTS 175913  8/1905  Fed. Rep. of Germany ........... 351/111

*Primary Examiner*—Paul A. Sacher
*Assistant Examiner*—Rodney B. Bovernick

[57] ABSTRACT

An eyeglass temple construction is provided that substantially reduces and eliminates slippage of the frame on the nose of the wearer by providing a weight of one-eighth to three-quarters ounce attached to the rear part of the temple which extends behind the wearer's ears at an angle of at least 60° from the plane formed by the straight section of the temple emanating directly from the eyeglass bridge.

4 Claims, 4 Drawing Figures

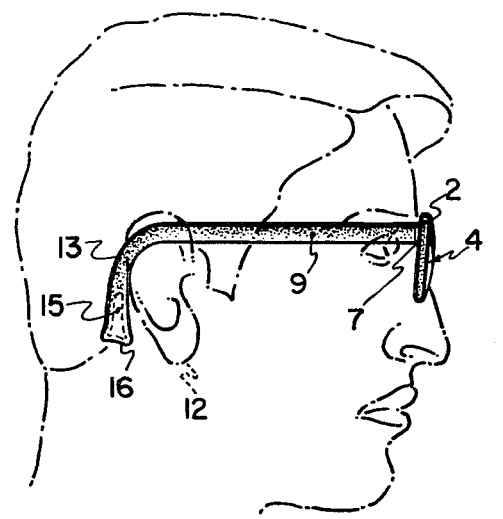
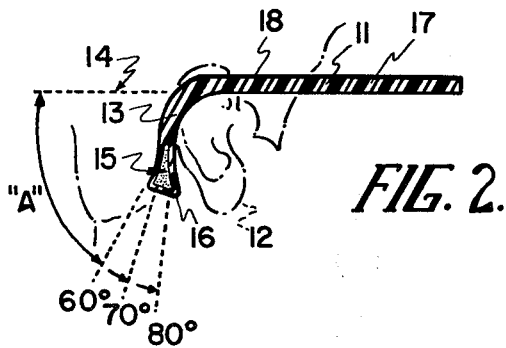
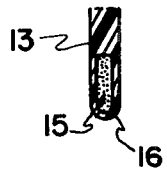
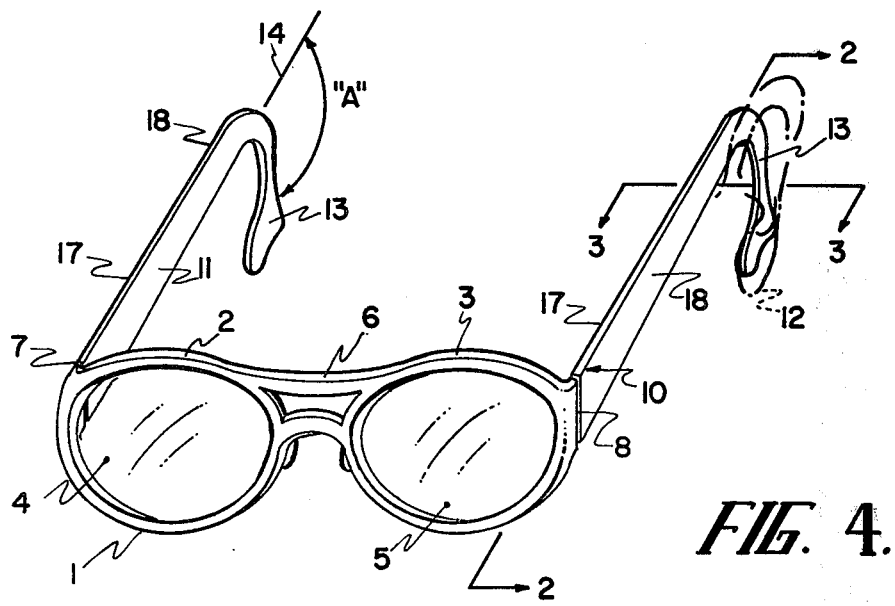

EYEGLASSES TEMPLE CONSTRUCTION

BACKGROUND OF THE INVENTION

Field of the Invention—This invention deals basically with spectacles and eyeglasses and more particularly with the construction of eyeglass temples.

Prior Art—One problem commonly incurred by all users of eyeglasses is that of slippage. This problem becomes particularly acute if the user is active or wearing his eyeglasses in humid weather. Most of the proposed solutions to this problem deal with the addition of non-skid surfaces, gripping devices and other various structural arrangements of either the eyeglass bridge or temple. Other solutions have proposed the use of weights at the ends of the temples; for example, see U.S. Bidgood Pat. No. 3,953,114, issued Apr. 27, 1976, and entitled "Cushion Retaining Means For Eyeglasses"; and U.S. Pettersson Pat. No. 1,854,060, issued Apr. 12, 1932, and entitled "Spectacles".

However, in all of the prior art samples recited, either the proposed solutions are uncomfortable to the wearer, do not satisfactorily prohibit the slippage of the eyeglasses on the wearer's nose, or are unsightly.

OBJECTS OF THE INVENTION

Therefore, it is an object of this invention to provide an eyeglass temple structure that effectively prevents slippage of the glasses on the wearer's nose.

Another object of this invention is to provide an eyeglass structure which is comfortable to the wearer and does not slip on the wearer's nose.

Other objects and advantages of this invention will become apparent from the ensuing descriptions of the invention.

Accordingly, an eyeglass structure is provided having a bridge to which are connected lenses with temples emanating from either end of the lens frames and extending over and around the ear with the lower portion of the temples being at an angle of at least 60° from the plane formed by the straight section of the temple and provided with weights.

BRIEF DESCRIPTION OF THE DRAWINGS

FIG. 1 is a perspective side profile view of one embodiment of the eyeglasses of this invention in position on a wearer's head.

FIG. 2 is a cross-sectional view of FIG. 4.

FIG. 3 is a cross-sectional view taken along lines 3—3 of FIG. 4.

FIG. 4 is a top perspective view of one embodiment of the eyeglasses.

PREFERRED EMBODIMENTS OF THE INVENTION

Referring to FIGS. 1 and 4, eyeglasses 1 comprise conventional lens frames 2 and 3 which hold lenses 4 and 5 respectively, and are connected together by a typical bridge or nose piece 6. Hingedly attached in a conventional manner at either ends 7 and 8 of frames 2 and 3 are temple members 9 and 10.

Each temple member comprises a straight section 11 which extends outward from frames 2 and 3 and over the wearer's ears 12 and a rear section 13 which is bent downward from section 11 at an angle "A" of at least 60° from the plane 14 formed by straight section 9 as more clearly seen in FIG. 2. Angle "A" is preferably between 70° to 80°.

Rear section 13 contains a weight 15 located in the end area 16 of rear section 13. Weight 15 can be constructed from lead or other similar dense materials, and preferably is enclosed in plastic 17. Preferably weight 15 will be between one-eighth to three-quarters ounce, and more preferably about three-eighths of an ounce for heavier frames and about three-sixteenths of an ounce for lighter frames.

Applicant has found that slippage of bridge 6 on the wearer's nose can only be prevented if weight 15 is positioned at rear area 16 which is located at angle "A" of at least 60°. At a lesser angle weight 15 actually increases slippage in many instances such as when the wearer tilts his head downward. Also at the preferred angle no additional device or gripping means is necessary to prevent slippage. Furthermore at the preferred angle the amount of weight added is not only not noticeable to the wearer, but actually appears lighter because of the better balance which eyeglasses now achieve on the face of the wearer. In particular the balance point 17 on eyeglasses has been extended to a position 18 on temples 9 and 10. The exact point of position 18 will depend on the structure and weight of frames 2 and 3, lenses 4 and 5, temples 9 and 10 and weight 15. By extending balance point 17 further away from ends 7 and 8, eyeglasses 1 will rest more stably on the wearer's nose and ears.

There are, of course, other various modifications of the temple structure included within the scope of this invention as defined by the following claims.

What I claim is:

1. Eyeglasses to be worn by a person having ears which comprises:
    (a) a lens frame to which is attached lenses; and
    (b) two temple members hingedly attached to each side of said frame, respectively, each of said temples comprising a straight section extending outward and over said person's ear and a rear section attached to said straight section at an angle between 60° and 80° from said straight section, each of said rear sections having a weight embedded therein, each of said weights weighing between $\frac{1}{8}$ and $\frac{3}{4}$ ounces.

2. Eyeglasses according to claim 1 wherein said angle is between 70° and 80°.

3. Eyeglasses according to claim 1 wherein said rear section is adjacent to and in contact with a portion of a back side of said ear.

4. Eyeglasses to be worn by a person having ears which comprises:
    (a) a lens frame to which is attached lenses; and
    (b) two temple members hingedly attached to each side of said frame, respectively, each of said temples comprising a straight section extending outward and over said person's ear and a rear section attached to said straight section at an angle of between 60° and 80° from said straight section, each of said rear sections having a weight embedded therein, each of said weights weighing three-eighths of an ounce.

* * * * *